R. BUCK.
CHERRY SEEDER.
APPLICATION FILED SEPT. 2, 1920.

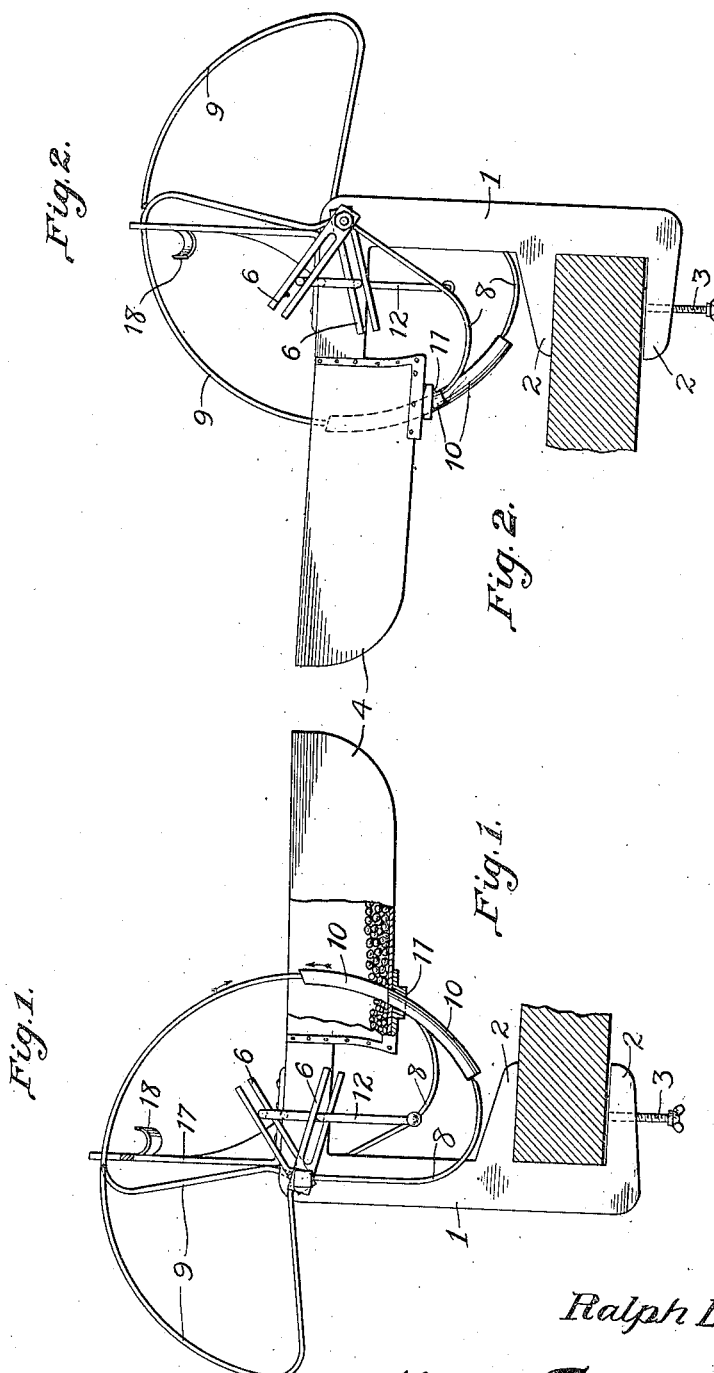

1,373,298.

Patented Mar. 29, 1921.
2 SHEETS—SHEET 2.

Inventor
Ralph Buck
By Mason Fenwick & Lawrence.
Attorneys.

UNITED STATES PATENT OFFICE.

RALPH BUCK, OF ST. PARIS, OHIO.

CHERRY-SEEDER.

1,373,298.   Specification of Letters Patent.   Patented Mar. 29, 1921.

Application filed September 2, 1920.   Serial No. 407,751.

*To all whom it may concern:*

Be it known that I, RALPH BUCK, citizen of the United States, residing at St. Paris. in the county of Champaign and State of Ohio, have invented certain new and useful Improvements in Cherry-Seeders; and I do hereby declare the following to be a full, clear, and exact description of the invention, such as will enable others skilled in the art to which it appertains to make and use the same.

This invention relates to fruit stoners and more particularly to cherry seeders.

The object of the invention is to provide a simple, efficient and automatic cherry seeding machine, adapted to feed from a full hopper.

The invention consists of certain novel structures, arrangements and combinations which are more particularly described and claimed hereinafter.

Two sheets of drawings accompany the specification as part thereof in which like reference characters denote like parts throughout.

Figure 1 is a front view of the device, partly in section,

Fig. 2 is a back view,

Figure 3:
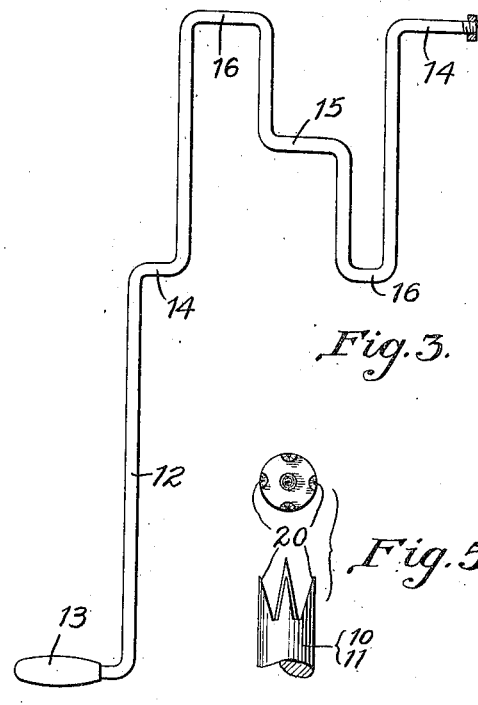
Fig. 3 is a detail view of the operating crank.

Referring to the drawings, the device comprises a frame 1 having table engaging arms 2—2, one of which is fitted with a thumb screw 3. Mounted on frame 1 is a hopper 4, a crank 12 and a plurality of slotted levers 6—6.

The device, as illustrated, is double, having duplicate seeding mechanism arranged in balanced relation on each side of the frame 1. Obviously the machine may be made with only one or with any desired number arranged similarly side by side.

For such a balanced double machine, the crank 12 is provided with a central bearing part 15 adapted to seat on frame 1 and with two diametrically opposed lever bearings 14—16 on each side for the purposes hereinafter described.

Figure 5:
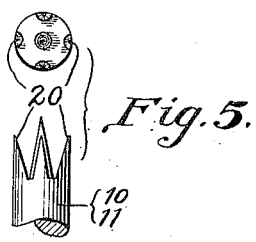
Fig. 5 shows details of an end of the spearing arm.
Figure 4:
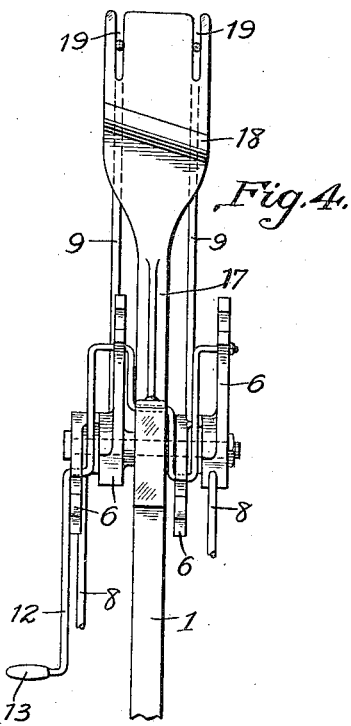
Fig. 4 is an end view with the hopper removed.
Figure 6:
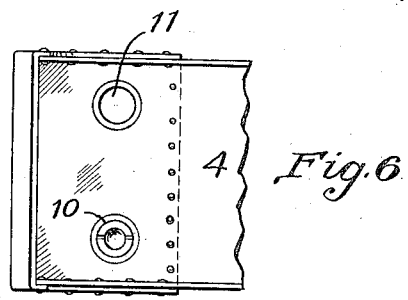
Fig. 6 is a fragmentary plan view of the hopper.
Figure 7:
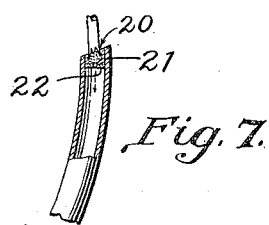
Fig. 7 is a fragmentary view of the feeder tube, with a cherry engaged therein by the spearing rod.
Figures 9, 10:
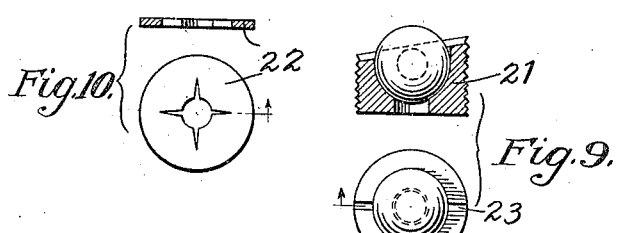
Figs. 9 and 10 show details of the seeding device.
Figure 8:
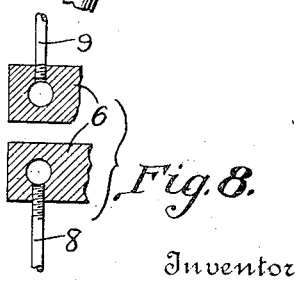
Fig. 8 shows details of the lever construction.

Pivotally mounted on frame 1, back of the crank bearing are the slotted levers 6—6, two on each side, adapted to engage between their fingers the lever bearings 14—16 of the crank and to be operated thereby. Fixedly secured to one of these levers is an arm 9 extending radially upward and then circumferentially as illustrated. The end of this arm 9 or spearing rod is pronged as shown in Fig. 5, having a plurality of cherry piercing and engaging points 20. To the end of the arm 8, which is similarly bent radially and circumferentially but extending downward, is attached a circumferentially bent feeding tube 10.

In the bottom of the hopper are provided suitably located orifices 11 adapted to receive and permit the reciprocation therein of the feeding tubes 10.

In the upper end of each feeding tube 10 is provided a washer 22 having a central opening through which the cherry stone is adapted to be pressed and this washer is held in place by a cup-shaped member 21 which is threaded into the tube 10 over the washer by means of the driver slots 23.

Mounted on frame 1 between the bearings for the crank and the levers is a vertical apron 17 having at its top vertical slots 19—19 through which the spearing rods 9—9 play and on the front face of this apron is affixed an inclined cherry catching trough 18.

In operation, the rotation of crank 12 by handle 13 transmits motion through the slotted levers 6 to the arms 8 and 9 so that feeder tube 10 starting with its open end at the bottom of hopper 4 as in Fig. 1 is elevated as indicated by the arrow to the top of the hopper carrying a cherry. At the same time, the piercing prong 9 starting from its elevated position back of the apron 17, passes forward through slot 19 in the apron and downward into the cup shaped member in the feeder tube 10, piercing the cherry and forcing the seed therefrom down through the central orifice in the washer 22. The motion of these arms is at this point reversed by the operation of crank 12 on levers 6—6 and the feed tube is withdrawn until its upper end is again adjacent the bottom of the hopper. At the same time, the piercing prong carrying the seeded cherry on the points 20 is elevated up and back through slot 19 of apron 17, the sides of the slot 19 engaging and removing the seeded cherry, which drops on to trough 18.

As stated, in the device illustrated, two seeders are arranged side by side in balanced relation so that the corresponding parts of each are operating in opposite directions at the same time, which arrangement tends to even the force required and this effect would doubtless be enhanced by increasing the number of balanced pairs in angular relationship.

What I claim is:

1. In a fruit seeder, the combination of a hopper having an orifice in its bottom, a reciprocating feeding device guided in said orifice and a reciprocating spearing prong operating above the hopper and adapted to spear and seed the fruit in the feeding device.

2. In a fruit seeder, the combination of a hopper having an orifice in its bottom, a feeding tube slidable in the orifice, a spearing prong, means for reciprocating the feeding tube, means for reciprocating the spearing prong and means for removing the seeded fruit from the spearing prong.

3. In a fruit seeder, the combination of a hopper having an orifice in its bottom, a feeding tube conforming to an arc of a circle slidable in the orifice, a spearing prong bent to conform to the arc of a circle, means for rotating said tube and prongs in successively opposite directions so that they will meet and partially telescope at the top of the hopper and means for removing the seeded fruit from the prong.

4. In a device of the character described, a feeding device comprising a tube bent longitudinally to conform to the arc of a circle, means secured to one end of the tube and having a central orifice to permit the passage of a fruit stone and a cup shaped member seated over the washer in the tube adapted to receive and seat a fruit.

5. In a device of the character described, the combination of a feeding device comprising a tube bent longitudinally to conform to the arc of a circle, means secured to one end of the tube to give it motion, a washer seated in the other end of the tube and having a central orifice to permit the passage of a fruit stone and a cup shaped member seated over the washer in the tube adapted to receive and seat a fruit, and a prong element adapted to partially telescope with said tube member, spearing and mashing the fruit and forcing the seed from the fruit through the central orifice of the washer.

6. In a fruit seeder, the combination of a hopper having a plurality of orifices in its bottom, tubular members adapted to reciprocate in said orifices and prong members adapted to reciprocate and periodically partially enter the tubular members, means for transmitting motion to the tubes and prongs, comprising a crank having a plurality of diametrically opposed lever bearings, a plurality of slotted levers adapted to engage said crank and rods secured to the levers bent radially and circumferentially and secured to said tubes and prong members substantially as specified.

In testimony whereof I affix my signature.

RALPH BUCK.